United States Patent
Nunokawa et al.

(10) Patent No.: US 7,327,277 B2
(45) Date of Patent: Feb. 5, 2008

(54) INFORMATION TRANSMISSION APPARATUS, INFORMATION TRANSMISSION METHOD, AND MONITORING APPARATUS

(75) Inventors: Katsuhiko Nunokawa, Kanagawa (JP); Akira Shinada, Tokyo (JP); Hiroaki Okajima, Chiba (JP); Toshiaki Sato, Tokyo (JP); Ippei Tambata, Kanagawa (JP); Hiroyuki Arai, Tokyo (JP); Masahiro Okuno, Kanagawa (JP); Hiroyuki Chigasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 10/485,824

(22) PCT Filed: Aug. 20, 2002

(86) PCT No.: PCT/JP02/08364

§ 371 (c)(1),
(2), (4) Date: Jul. 9, 2004

(87) PCT Pub. No.: WO03/019521

PCT Pub. Date: Mar. 6, 2003

(65) Prior Publication Data

US 2004/0243324 A1     Dec. 2, 2004

(30) Foreign Application Priority Data

Aug. 22, 2001  (JP) ............................... 2001-251405

(51) Int. Cl.
*G08B 5/00* (2006.01)
*G08B 5/22* (2006.01)

(52) U.S. Cl. ............................ 340/815.4; 340/815.45; 340/7.61; 340/691.1

(58) Field of Classification Search ............. 340/815.4, 340/815.45, 7.58, 7.6, 7.61, 691.1, 691.6; 455/567, 566, 90.3

See application file for complete search history.

(56) References Cited

U.S. PATENT DOCUMENTS

| 4,031,449 A | 6/1977 | Trombly ......................... 320/2 |
| 6,175,721 B1 * | 1/2001 | Hayato ...................... 340/7.58 |
| 6,463,278 B2 * | 10/2002 | Kraft et al. .................. 455/418 |
| 6,720,863 B2 * | 4/2004 | Hull et al. .................. 340/7.51 |
| 6,928,306 B2 * | 8/2005 | Matsuda et al. ............ 455/567 |
| 6,944,482 B2 * | 9/2005 | Engstrom et al. ........... 455/566 |
| 6,963,762 B2 * | 11/2005 | Kaaresoja et al. .......... 455/567 |
| 2005/0275559 A1 * | 12/2005 | Fussinger et al. ........ 340/815.4 |

FOREIGN PATENT DOCUMENTS

| EP | 1 120 740 | 8/2001 |
| JP | 63-300772 | 12/1988 |
| JP | 33205/94 | 4/1994 |
| JP | 67739/1992 | 4/1994 |
| JP | 2001-210114 | 8/2001 |
| JP | 2002-192983 | 7/2002 |
| JP | 2002-199499 | 7/2002 |

* cited by examiner

*Primary Examiner*—Toan N. Pham
(74) *Attorney, Agent, or Firm*—Oblon, Spivak, McClelland, Maier & Neustadt, P.C.

(57) ABSTRACT

In an information transmitter (2) which is a portable personal information device, a system control circuit (26) analyzes information on vibration obtained from an acceleration sensor (22), information on temperature obtained from a temperature sensor (21), or external information such as user's personal information obtained from a communication section (24) and selects a light-emission pattern of LEDs (11 and 12), a vibration pattern of vibrators (30 and 31), and a sound generated by a sound-reproducing section (25).

13 Claims, 13 Drawing Sheets

INFORMATION TRANSMISSION APPARATUS, INFORMATION TRANSMISSION METHOD, AND MONITORING APPARATUS

BACKGROUND OF THE INVENTION

1. Technical Field

The present invention relates to an apparatus and a method for transmitting information and to a monitoring device, which can be applied to, for example, portable personal information devices. The invention selects a light-emission pattern by analyzing information obtained from the exterior and drives specified light-emitting means with the light-emission pattern, thereby increasing the attachment to the device as compared with conventional ones.

2. Background Art

Known portable information devices have been so designed that they may transmit the state of various triggers and the devices to the users simply and accurately.

Specifically, for example, cellular phones provide the users with the state of the devices by indications of batteries and the intensity of electric fields and notify the users of the incoming of electronic mails and calls with ringing sounds. With personal computers, notifications of power consumption and access to hard disk drives are given by the lighting of light-emitting diodes.

Of the information devices, the cellular phones also have been designed to notify the users of incoming calls with phone melodies corresponding to the persons on the other end of the phones in place of ringing sounds. With the personal computers, the personalities of the users are allowed to exhibit by the designs of display screens with wall papers or the like. Such designs will increase the attachment to the devices for the users.

When this type of various information devices are given more attachment by the user, rough operation and handling can be prevented so that visible and invisible various benefits will be offered.

DISCLOSURE OF INVENTION

The present invention has been made in consideration of the above problems. Accordingly, it is an object of the invention to propose an apparatus and a method for transmitting information and a monitoring device, which increase the attachment to the device as compared with the conventional ones.

In order to achieve the above object, the present invention is applied to an information transmitter, which includes information-obtaining means for obtaining information from the exterior; information-analyzing means for analyzing the information obtained by the information-obtaining means and selecting a light-emission pattern; and driving means for driving specified light-emitting means with the light-emission pattern.

The structure of the invention includes information-obtaining means for obtaining information from the exterior; information-analyzing means for analyzing the information obtained by the information-obtaining means and selecting a light-emission pattern; and driving means for driving specified light-emitting means with the light-emission pattern. Accordingly, external information can be sent to the user by a complicated expressing technique such as abstract-feeling expressions, thereby increasing the attachment to the device as compared with the conventional ones.

The present invention is applied to an information transmitter, which includes information-obtaining means for obtaining information from the exterior; information-analyzing means for analyzing the information obtained by the information-obtaining means and selecting a vibration pattern; and driving means for driving a specified vibrating element with the vibration pattern.

According to the structure of the present invention, an application to an information transmitter includes information-obtaining means for obtaining information from the exterior; information-analyzing means for analyzing the information obtained by the information-obtaining means and selecting a vibration pattern; and driving means for driving a specified vibrating element with the vibration pattern. Accordingly, external information can be sent to the user by expressing abstract feelings with vibration, thereby increasing the attachment to the device as compared with the conventional ones.

The present invention is applied to an information transmitter, which includes information-obtaining means for obtaining information from the exterior; information-analyzing means for analyzing the information obtained by the information-obtaining means and selecting a sound; and driving means for driving sound-generating means to output the sound.

According to the structure of the invention, an application to an information transmitter includes information-obtaining means for obtaining information from the exterior; information-analyzing means for analyzing the information obtained by the information-generating means and selecting a sound; and driving means for driving sound-outputting means to output the sound. Accordingly, external information can be sent to the user by expressing abstract feelings with various sounds, thereby increasing the attachment to the device as compared with the conventional ones.

The present invention is applied to a method for transmitting information, which includes a light-emission-pattern selecting step of selecting a light-emission pattern by analyzing information obtained from the exterior; and a driving step of driving specified light-emitting means with the light-emission pattern.

According to the structure of the invention, a method for transmitting information can be provided which is capable of increasing the attachment to the device as compared with the conventional ones.

The invention is applied to a monitoring device, which includes information-obtaining means for obtaining information; information-analyzing means for analyzing the information obtained by the information-obtaining means and selecting a light-emission pattern; and driving means for driving specified light-emitting means with the light-emission pattern and outputting the result of monitoring.

According to the structure of the invention, an application to a monitoring device includes information-obtaining means for obtaining information; information-analyzing means for analyzing the information obtained by the information-obtaining means and selecting a light-emission pattern; and driving means for driving specified light-emitting means with the light-emission pattern and outputting the result of monitoring. Accordingly, during the monitoring of various information, the result of the monitoring can be transmitted to the user by abstract-feeling expressions, thereby increasing the attachment to the device as compared with the conventional ones.

BEST MODE FOR CARRYING OUT THE INVENTION

Embodiments of the present invention will be described with reference to the drawings as necessary.

(1) First Embodiment

(1-1) Structure of First Embodiment

Figure 1:
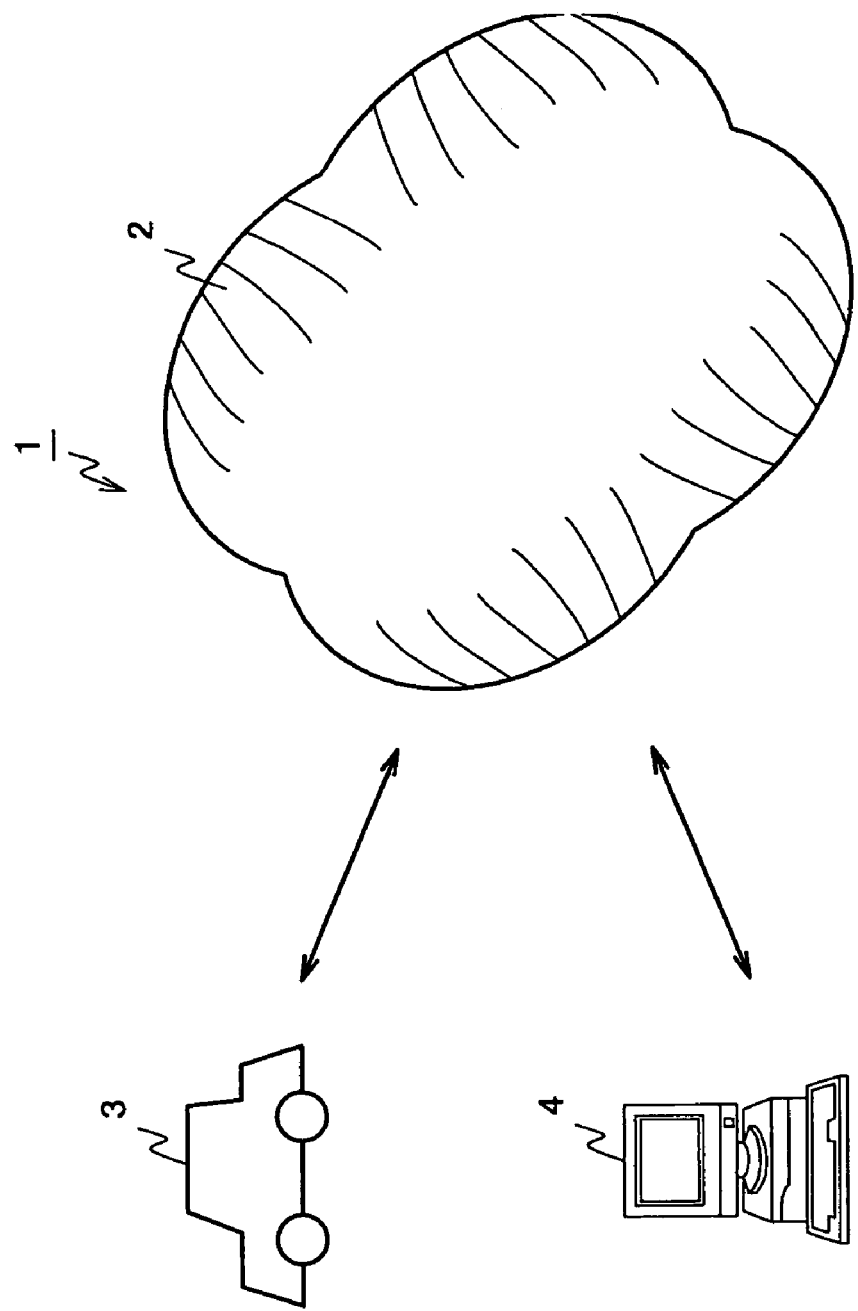
FIG. 1 is a perspective view of an information transmitter according to a first embodiment of the present invention.

FIG. 1 is a schematic diagram of an information processing system according to an embodiment of the present invention. In the information processing system 1, an information transmitter 2 is a portable information terminal in which user's various personal information is recorded. The information transmitter 2 can be carried into a car 3 to be disposed in a specified cradle so as to operate the car 3. The information transmitter 2 accumulates user's personal information from various information obtained in the car 3 and takes it out of the car into a cradle of a user's personal computer 4 so that the user's personal information can be uploaded into the personal computer 4 and the personal information can be downloaded from the personal computer 4 to be used and checked in the car 3.

The information transmitter 2 is shaped in a rounded rectangle as a whole, the largest opposing surfaces protruding at the four corners in rounded shape. Thus, the information transmitter 2 is shaped so as to fit a user's hand in carrying. The information transmitter 2 is formed such that parts such as switches and connectors necessary for operation are not at all exposed from the surface. Accordingly, the information transmitter 2 is allowed to ensure a good design and improve reliability.

Figure 2:
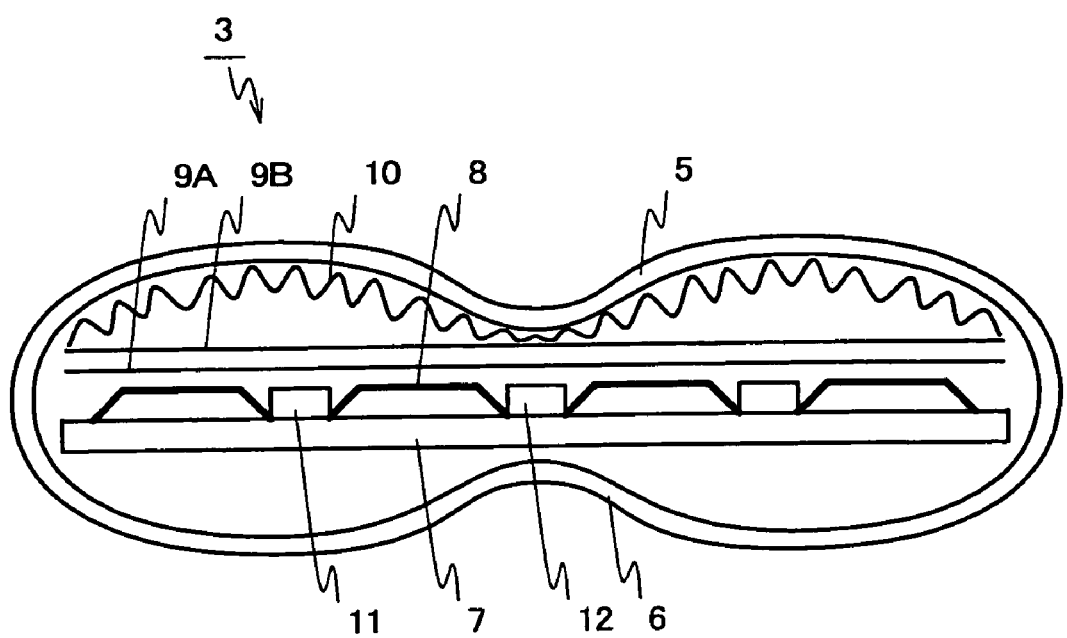
FIG. 2 is a cross-sectional view of the information transmitter of FIG. 1.

Referring to the sectional view of FIG. 2 taken along the length, the information transmitter 2 is formed of a multi-layer of a substrate 7, a reflector 8, deflectors 9A and 9B, and a diffuser 10 housed in a front casing 5 and a back casing 6.

Figure 3:
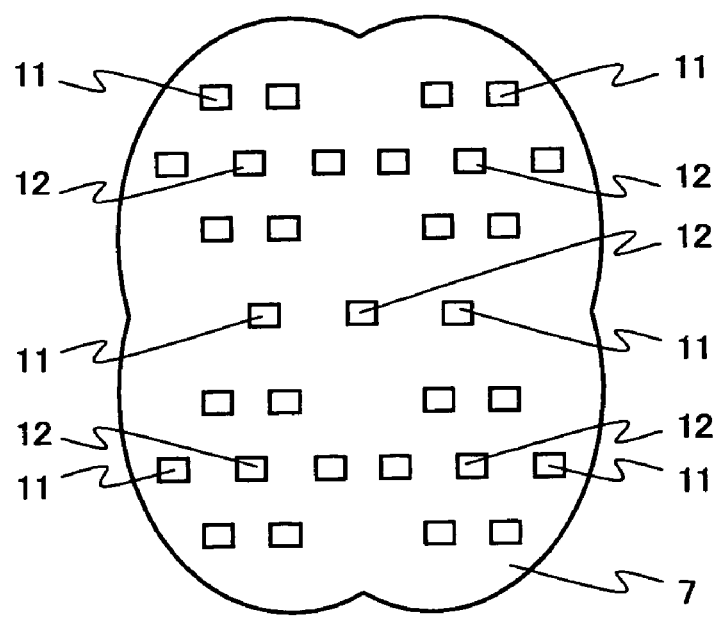
FIG. 3 is a plan view of the substrate of the information transmitter of FIG. 1.

Referring to FIG. 3, the substrate 7 is formed substantially in a rounded rectangle corresponding to the outer shape of the information transmitter 2, whose entire surface, except a plurality of surface-mounted light-emitting diodes 11 and 12, is coated with a resist so that other mounted parts are not illuminated by the lighting of the light-emitting diodes 11 and 12.

The reflector 8 is formed almost in the same shape as the substrate 7, in which the parts corresponding to the light-emitting diodes 11 and 12 are recessed, in the respective centers of which openings are formed for the light-emitting diodes 11 and 12 to be exposed. Thus, the reflector 8 reflects the light of the light-emitting diodes 11 and 12 by the slope of the recess to let the light emitted from the light-emitting diodes 11 and 12 toward the front efficiently. The reflector 8 is colored in the same color as that of the front casing 5 and the back casing 6 so that other mounted parts other than the light-emitting diodes 11 and 12 are not viewed from the exterior of the casing.

The deflectors 9A and 9B receive the emission light from the light-emitting diodes 11 and 12 directly or through the reflection by the reflector 8 and deflect the light in different directions. The information transmitter 2 is constructed such that when it is viewed through the front casing 5, the point light sources by the light-emitting diodes 11 and 12 can be viewed as a surface light source with faint light owing to the deflection by the deflectors 9A and 9B even with a structure in which the light-emitting diodes 11 and 12 are arranged close to the front casing 5.

The diffuser 10 is formed in wavy cross section along the length of the front casing and in the direction perpendicular to the length to diffuse the emission light from the light-emitting diodes 11 and 12. Thus, the information transmitter 2 is constructed such that the emission light from the light-emitting diodes 11 and 12 is further viewed by the faint light and the light and shade corresponding to the wavy shape of the diffuser 10.

The front casing 5 and the back casing 6 are made by injection molding a transparent resin into a smooth shape and coloring the inner surface. Thus, the information transmitter 2 is constructed such that the light emission of the light-emitting diodes 11 and 12 can be viewed from the exterior.

Figure 4:
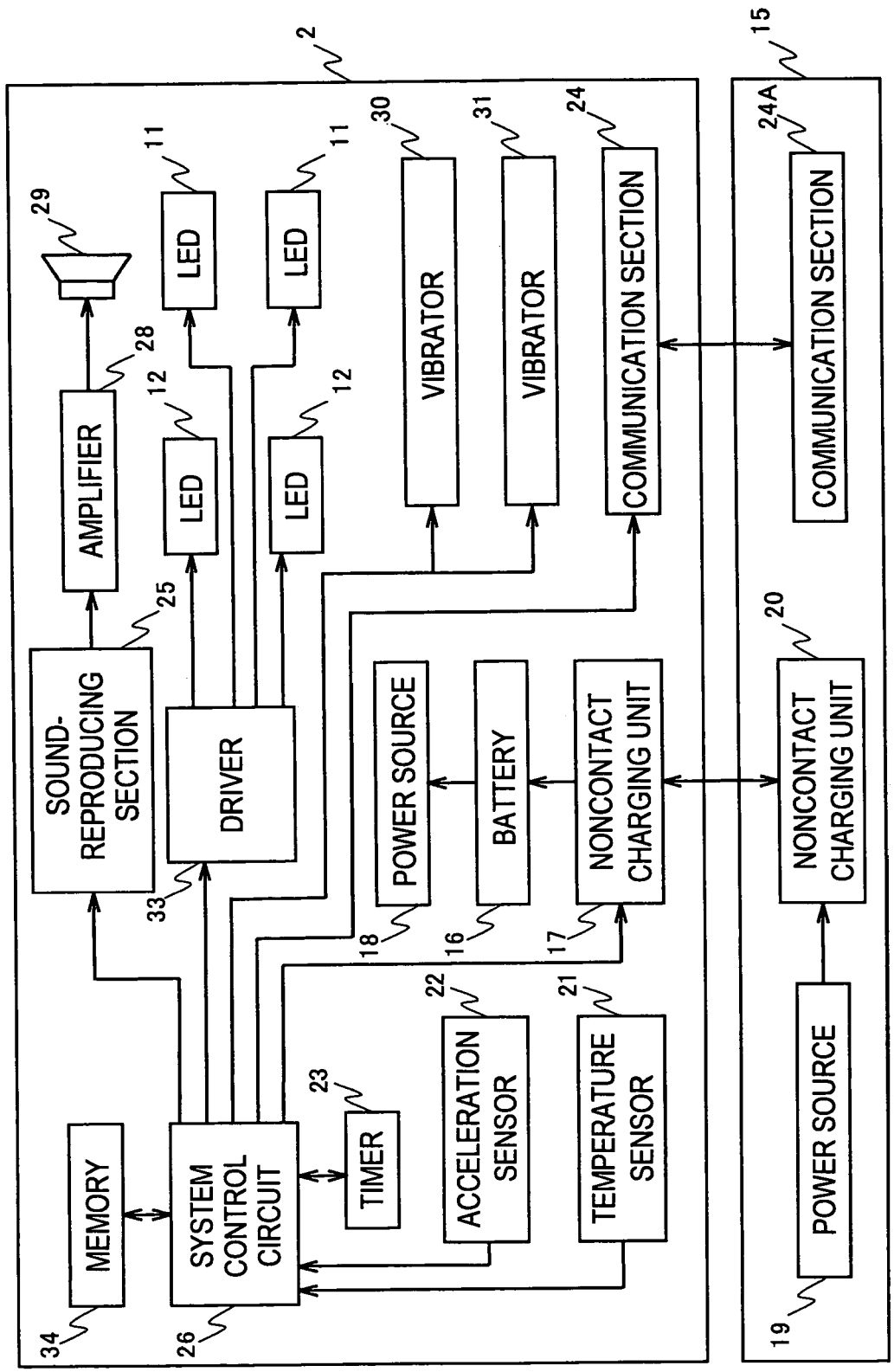
FIG. 4 is a block diagram of the information transmitter of FIG. 1.

FIG. 4 is a block diagram of the structure of the information transmitter 2. The information transmitter 2 is disposed in a cradle 15 provided in the interior of the car 3, the personal computer 4 and so on, and its built-in battery 16 is charged.

Specifically, in the information transmitter 2, a noncontact charging unit 17 rectifies the electricity induced by a loop antenna provided to the substrate 7 and charges the battery 16 with the obtained electricity. The information transmitter 2 generates operating electricity at a power source 18 with the electricity of the battery 16.

The cradle 15 includes a noncontact charging unit 20 corresponding to the structure of the information transmitter 2. In the noncontact charging unit 20, a loop antenna is driven by the electricity of a power source 19 to send the electricity to the information transmitter 2.

In the information transmitter 2, the noncontact charging unit 17 constructs a charging mechanism for generating charging power with the electricity induced in a coil, with which charging the built-in battery, while the power source 18 constructs a power supply for supplying the power of the battery to various elements.

In the information transmitter 2, a temperature sensor 21 senses the temperature of the information transmitter 2 and outputs the determination and an acceleration sensor 22 senses the acceleration given to the information transmitter 2 and outputs the determination. In this embodiment, the acceleration sensor 22 applies one having sensitivity in two orthogonal axial directions. In place of the biaxial acceleration sensor, a triaxial acceleration sensor may be applied. A timer 23 senses the present time and outputs it. Accordingly, the information transmitter 2 can determine the present situation by the temperature, the acceleration, and the present time.

A communication section 24 is a radio communication mechanism capable of bidirectional communication with other devices. For example, a radio communication mechanism such as Bluetooth, IEEE802.11b applies. This allows the information transmitter 2 to transmit and receive various information with the information processing system mounted in the car 3, the personal computer 4 and so on.

The cradle 15 is provided with a communication section 24A corresponding to the communication section 24, in correspondence with the structure of the information transmitter 2.

The information transmitter 2 obtains the information on vibration from the exterior with the acceleration sensor 22, while it acquires user's personal information from the exterior through the communication section 24.

A sound-reproducing section 25 plays back various sounds and output them under the control of a system control circuit 26. In this embodiment, the sound-reproducing section 25 plays back human natural voices, sounds like a musical instrument, and mechanical signal sounds. An amplifier 28 drives a speaker 29 according to a sound signal outputted from the sound-reproducing section 25. Thus, the information transmitter 2 is allowed to play back various sounds by the instruction of the system control circuit 26 and output them.

Vibrators 30 and 31 are vibration elements having different vibration frequencies. The information transmitter 2 drives the two vibrators 30 and 31 selectively or simultaneously to vibrate the whole with three vibration patterns.

A driver 33 drives the plurality of light-emitting diodes 11 and 12 arranged to the information transmitter 2 under the control of the system control circuit 26. At that time, the driver 33 drives the light-emitting diodes 11 and 12 to gradually increase the light quantity to light on the light-emitting diodes 11 and 12 or gradually decrease the light quantity to light off the light-emitting diodes 11 and 12, thereby giving the user soft impulse.

As shown in FIG. 3, the information transmitter 2 has three light-emitting diodes 11 and 12 in the center of the length and in the direction perpendicular to the length. Of the three light-emitting diodes 11 and 12, to the central light-emitting diode 12, a multicolor light-emitting diode is applied which has different color chips sealed in one package, while to the opposite light-emitting diodes 11, a single-color light-emitting diode is applied which emits single-color light.

The information transmitter 2 also has circular single-color light-emitting diodes 11 in the four corners and multicolor light-emitting diode 12 in the center of each circle. The arrangement of the circular light-emitting diodes 11 includes six light-emitting diodes. The information transmitter 2 has the light-emitting diodes 11 and 12 arranged in the direction perpendicular to the length and in a straight line in the slanting direction. Thus, the information transmitter 2 is allowed to form various light-emission patterns with the central multicolor light-emitting diode 12 as the center by the driving of the light-emitting diodes 11 and 12. The multicolor light-emitting diode 12 emits red, blue, green, and yellow light rays (the respective colors of light are indicated by R, B, G, and Y in the following drawings) by the switching of the drive, while the single-color light-emitting diodes 11 each emit a blue light ray.

A memory 34 is a flash memory for accumulating user's various personal information and holding it.

The system control circuit 26 is a controller for controlling the operation of the information transmitter 2, which controls the entire operation under the control from external devices, which is given through the communication section 24, and in accordance with various information determined by the temperature sensor 21, the acceleration sensor 22, and the timer 23.

Specifically, the system control circuit 26 outputs the personal information stored in the memory 34 through the communication section 24 and updates the contents of the memory 34 in accordance with the personal information acquired through the communication section 24 when the information transmitter 2 is mounted to the cradle 15 of the personal computer 4 and the instructions for uploading and downloading of the personal information are given by an application program held in the personal computer 4 through the communication sections 24A and 24.

The system control circuit 26 outputs authentication information for driving the car 3 in accordance with the personal information stored in the memory 34 when the information transmitter 2 is mounted to the cradle 15 of the car 3 and an instruction for personal authentication is given by the system controller of the car 3, thus allowing the information transmitter 2 to be used in place of the key to the car 3. Similarly, the system control circuit 26 outputs the personal information stored in the memory 34 through the communication section 24 and updates the contents of the memory 34 in accordance with the personal information given through the communication section 24 when instructions for uploading and downloading of the personal information are given by the system controller of the car 3.

Thus, the information transmitter 2 is constructed so as to be carried so that various personal information is inputted and outputted to/from the information processing systems arranged in various places, thus to be used as a substitute for a key and as various personal authentication systems. Furthermore, it allows personal information to be carried, such as favorite sites on the Internet, favorite TV programs and genres, the use conditions of other devices, application programs used in personal computers, and the information on the car driving.

In the information processing system 1, since personal information can be carried with the information transmitter 2 and used in the car 3, the personal computer 4 and so on, the information on vacation resorts and so on which were searched for in advance by the personal computer 4 can be used in the car 3 and, conversely, the information on vacation resorts where the user visited by the car 3 and the information on driving technique can be processed by the personal computer 4. In addition to the device having the cradle 15, personal information can be transmitted and received to/from various devices having communication means to allow it to be used as the key to home, various entrance and exit control and so on.

Accordingly, the information transmitter 2 is constructed such that the system control circuit 26 analyzes the personal information and accumulates the information on user's hobbies and interests as personal information through the input and output of the personal information regarding the personal interests.

The system control circuit 26 drives the light-emitting diodes 11 and 12, the vibrators 30 and 31, and the sound-reproducing section 25 in accordance with the personal information inputted and outputted through the communication section 24 and the various information determined by the temperature sensor 21, the acceleration sensor 22, and the timer 23, thereby responding to the external information.

In this processing, the system control circuit 26 analyzes the personal information inputted and outputted through the communication section 24 and the vibration information determined by the acceleration sensor 22 and generates virtual feelings in assumption that the information transmitter 2 had feelings. The system control circuit 26 transmits the feelings to the user through the light-emitting diodes 11 and 12, the sound-reproducing section 25 and so on. In this way, the information transmitter 2 transmits virtual feeling to the user with the light-emission patterns of the light-emitting diodes 11 and 12, the vibration patterns of the vibrators 30 and 31, and the sounds by the sound-reproducing section 25.

In other words, the system control circuit 26 sets the operation mode to a standby mode, a power-saving mode, and an operating mode in accordance with the information inputted and outputted through the communication section 24 and the information on the vibration determined by the acceleration sensor 22. The standby mode is an operation mode during charging with no external stimulation. When there is no access for a specified time period or more through the communication section 24 or no external vibration detected for a specified time period or more through the acceleration sensor 22 during charging, the system control circuit 26 switches the entire operation mode to the standby mode and drives the light-emitting diodes 11 and 12 with a light-emission pattern in the standby mode. The system control circuit 26 stops the driving of the sound-reproducing section 25 and the vibrators 30 and 31 during the standby mode.

Figure 5:
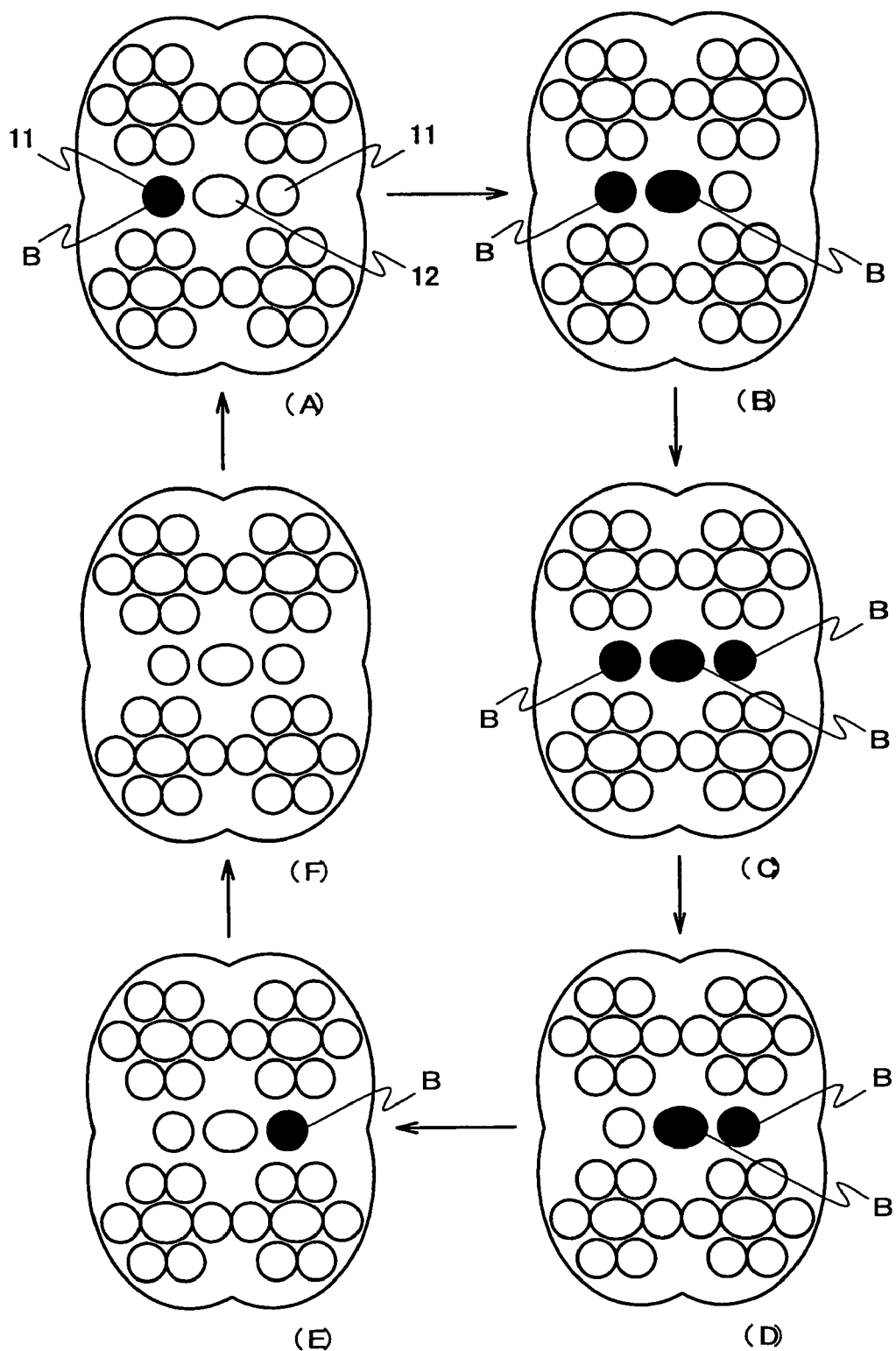
FIG. 5 is a plan view of a light-emission pattern in standby mode.

FIG. 5 shows the light-emission pattern in the standby mode in plan view. The system control circuit 26 lights on the left light-emitting diode 11 of the central three light-emitting diodes 11 and 12 in FIG. 5 (FIG. 5(A)), then lights on the central light-emitting diode 12 (FIG. 5(B)), and thereafter lights on the right light-emitting diode 11 (FIG. 5(C)). Subsequently, they light off from the first-lit light-emitting diode 11 in order (FIGS. 5(C) to (F)). The system control circuit 26 repeats the light-emission pattern at regular intervals. In FIG. 5, the lit light-emitting diodes are indicated by solid fills and the multicolor light-emitting diode 12 is lit on in blue.

On the other hand, the power-saving mode is an operation mode in which the power to part of the circuit block is stopped by the control of the power source 18 to reduce the power consumption of the battery 16, wherein when there is no access through the communication section 24 for a specified time period or more or external vibration is not detected by the acceleration sensor 22 for a specified time period or more, the system control circuit 26 switches the operation mode to the power-saving mode.

On the other hand, when there is an access through the communication section. 24 or external vibration is sensed by the acceleration sensor 22 in the power-saving mode, the system control circuit 26 completes the power-saving operation mode and executes virtual-feeling generating process. Accordingly, the information transmitter 2 is constructed to start up the action by the operation such as strong vibration or tilting, with the acceleration sensor 22 and the communication section 24 functioning as switches to start up power supply.

In the virtual-feeling generating process, the system control circuit 26 generates a virtual feeling in accordance with the personal information given by the communication section 24 and the vibration information determined by the acceleration sensor 22 with reference to the record in the memory 34 and selects a light-emission pattern, a vibration pattern, or a sound by the determination with the feeling as reference and drives a corresponding element.

At that time, the system control circuit 26 sets the light-emission pattern of the multicolor light-emitting diode 12 while creating the meaning of each light color. Specifically, in this embodiment, common user's feelings, which are generally accepted in the world, are assigned to the respective light colors: "good" is assigned to green light, "bad" is assigned to red light, "attention" is assigned to yellow light, and "not good" or other various meanings that cannot be assigned to the other light colors is assigned to blue light.

In other words, the system control circuit 26 monitors personal information to be uploaded and downloaded through the communication section 24, determines user's hobbies and interests, and records the information as part in the memory 34. The treatment of the user is also recorded in the memory 34 as personal information through the long-time processing of the information given by the acceleration sensor 22 and so on.

The system control circuit 26 digitizes the various information acquired by the communication section 24 and the vibration information acquired by the sensor 22 to create an feeling level and calculates a physical strength by continuous operation time and the remaining amount of the battery. The information transmitter 2 records a plurality of characteristic curves in the memory 34 which is of a sign wave with different phases which is plotted with the feeling level as abscissa against the physical level as ordinate and in which feelings are set in the respective parts. The system control circuit 26 selects the characteristic curve depending on the calculated physical level and then determines a feeling set on the characteristic curve depending on the feeling level. Words in terms of a specified language system are assigned under the determined feelings according to the various information obtained from the communication section 24, with which specific feelings are expressed.

In this process, the system control circuit 26 creates feeling levels with reference to the user's hobbies, interests and the treatment of the user, which are recorded as personal information in the memory 34. Thus, when the user frequently strikes or drops the information transmitter 2, the system control circuit 26 will not express an unpleasant feeling even if it is struck a little. Accordingly, the information transmitter 2 is constructed to be customized to the user. The information on the customization can be downloaded and uploaded in the car 3 and the personal computer 4 as necessary.

Specifically, in the embodiment, the feelings of "happiness," "anger," "surprise," "sorrow," and "fear" are set on the characteristic curves of the feeling level and the physical level. "Other" is set for the case that cannot be processed by the characteristic curves of the feeling level and the physical level. The case of "others," is assigned the word "sleepy" for the case of low temperature when left observed, the word "understanding" for the case where information has been received, the word "confusion" for the case where received information cannot be analyzed, and the word "mounted to cradle" for the specified time after the transmitter has been mounted to the cradle 15, to which a corresponding light-emission pattern, vibration pattern, or sound pattern are assigned.

In this language system, the words, "good," "during consideration," "look around," "vigorous," and "delightful" are assigned to the feeling of happiness. The word "good" is set for the case where it can be determined according to the information from the in-vehicle device that long-distance driving has been made, the case where it can be determined according to the information from the acceleration sensor that long-time walking has been made, the case where personal information has been increasingly accumulated, and the case where it can be determined according to the information from the in-vehicle device that a smooth driving operation has been made. The word "during consideration" is set for the case where data is being transmitted by the communication section and the case where data is being analyzed. The word "look around" is set for the case where information is being searched for. The word "vigorous" is set for the case where access is given from the same type of information transmitter or the case where a response to a call is given from the same type of information transmitter. The word "delightful" is set for the case where the user has come back to the car 3.

Figure 6:
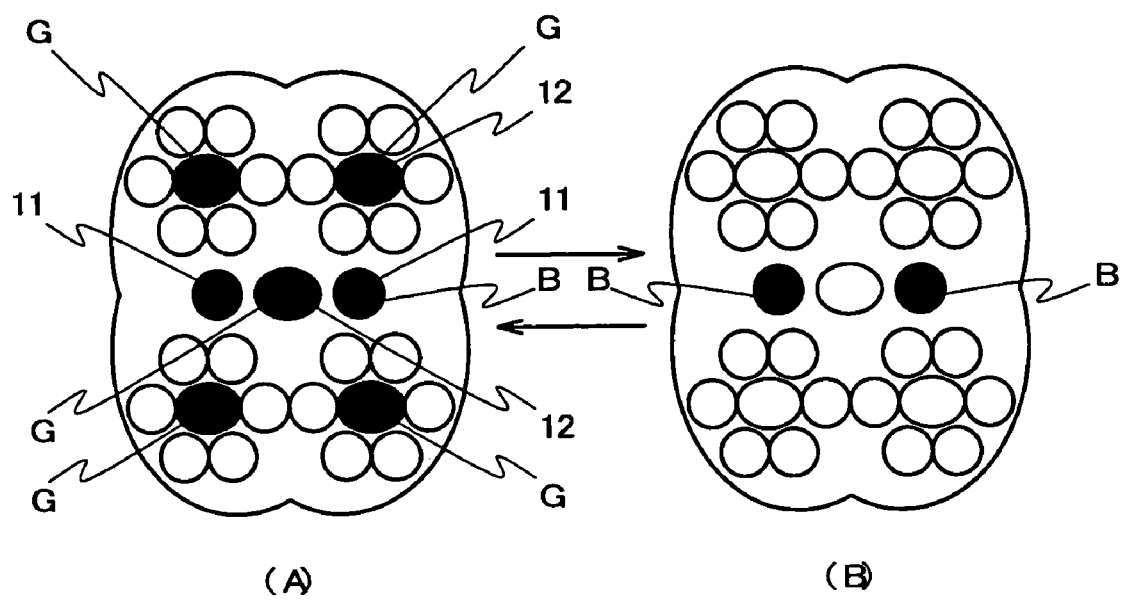
FIG. 6 is a plan view of a light-emission pattern in the case of "good."

In the case of "good," the system control circuit 26 lights on the light-emitting diodes 11 and 12 by repeating the light-emission pattern of FIGS. 6(A) and (B). In this light-emission pattern, the central three light-emitting diodes 11 and 12 are lit on in blue and green, the light-emitting diodes 12 at the four corners are lit on in green (FIG. 6(A)), and the opposite light-emitting diodes 11 of the central three light-emitting diodes 11 and 12 are lit on (FIG. 6(B)), which is repeated to transmit the feeling of the information transmitter 2 to the user.

The system control circuit 26 repeats the lighting in a relatively slow cycle and varies the rate of the light emission, the luminance of the light-emitting diodes 11 and 12, and the volume of the sound depending on the temperature sensed by the temperature sensor 21.

Figure 7:
FIG. 7 is a note of a sound in the case of "good."
Figure 8:
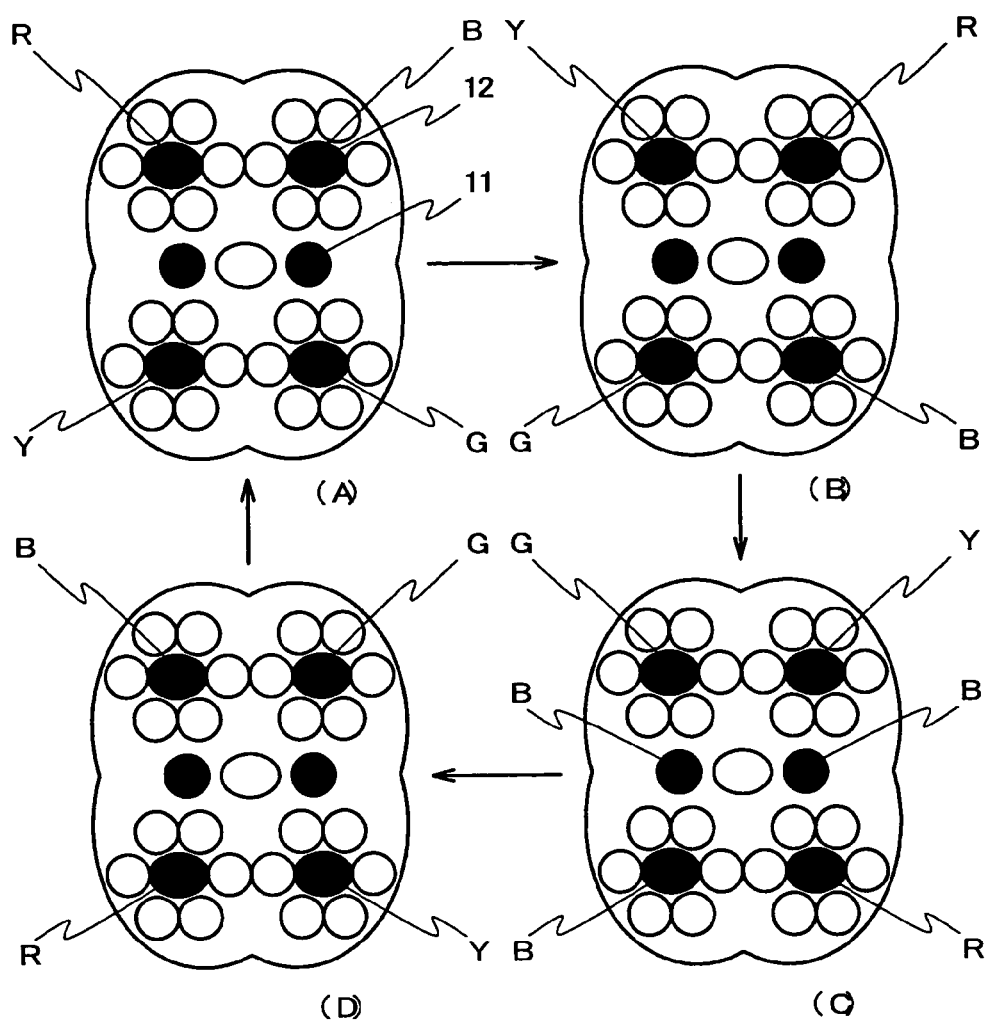
FIG. 8 is a plan view of a light-emission pattern in the case of "during consideration."

In synchronization with the lighting of the light-emitting diodes 11 and 12, the sound-reproducing section 25 is driven to generate a light mechanical sound with a musical interval expressed by the note of FIG. 7.

For the case of "during consideration," the light-emitting diodes 11 and 12 are lit on with the repeated light-emission pattern of FIGS. 8(A) to (D). In this light-emission pattern, the opposite light-emitting diodes 11 of the central three light-emitting diodes 11 and 12 are lit on and the multicolor light-emitting diodes 12 at the four corners are lit on in red, blue, green, and yellow, respectively, wherein the color-light emissions of the multicolor light-emitting diodes 12 are cycled clockwise. The system control circuit 26 repeats the lighting in a relatively slow cycle, as in the case of "good," and varies the rate and so on depending on the temperature sensed by the temperature sensor 21.

Figure 9:
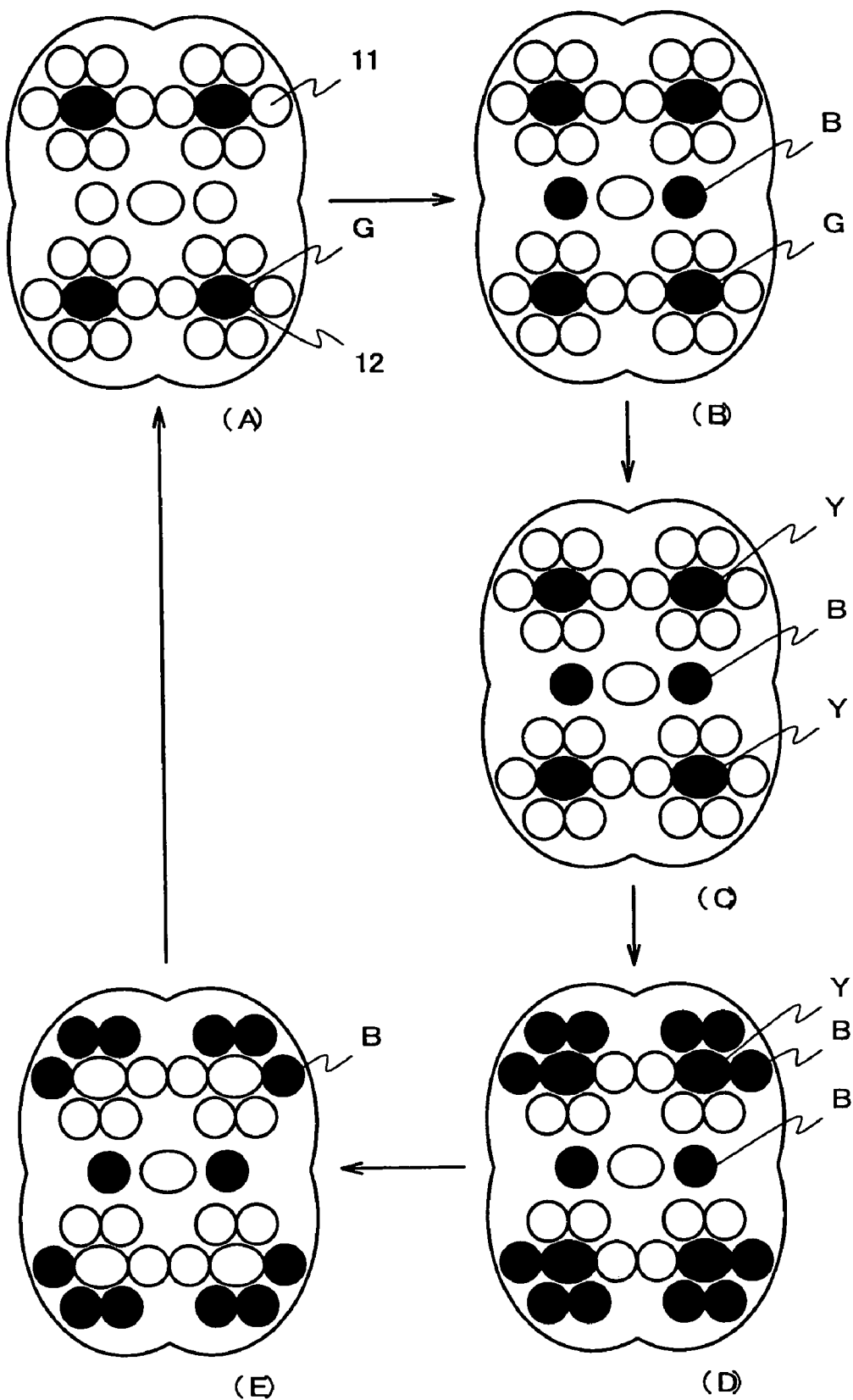
FIG. 9 is a plan view of a light-emission pattern in the case of "vigorous."

FIG. 9 shows the light-emission pattern for the word "vigorous" in plan view. In this case, the system control circuit 26 lights on the multicolor light-emitting diodes 12 at the four corners in green (FIG. 9(A)), thereafter lights on the opposite light-emitting diodes 11 of the central three light-emitting diodes 11 and 12 (FIG. 9(B)), and then switches the light by the multicolor light-emitting diodes 12 from green to yellow (FIG. 9(C)). Subsequently, the system control circuit 26 lights on the three light-emitting diodes 11 outside the respective multicolor light-emitting diodes 12 at the four corners (FIG. 9(D)) and lights off the multicolor light-emitting diodes 12 (FIG. 9(E)). The system control circuit 26 repeats the light-emission pattern in synchronization with the cycle of vibration.

For the feeling of "anger," the word "angry" is assigned to the case where the car 3 is driven roughly, the case where the device is struck continuously, the case where the device is left, and the case where it is hot.

Figure 10:
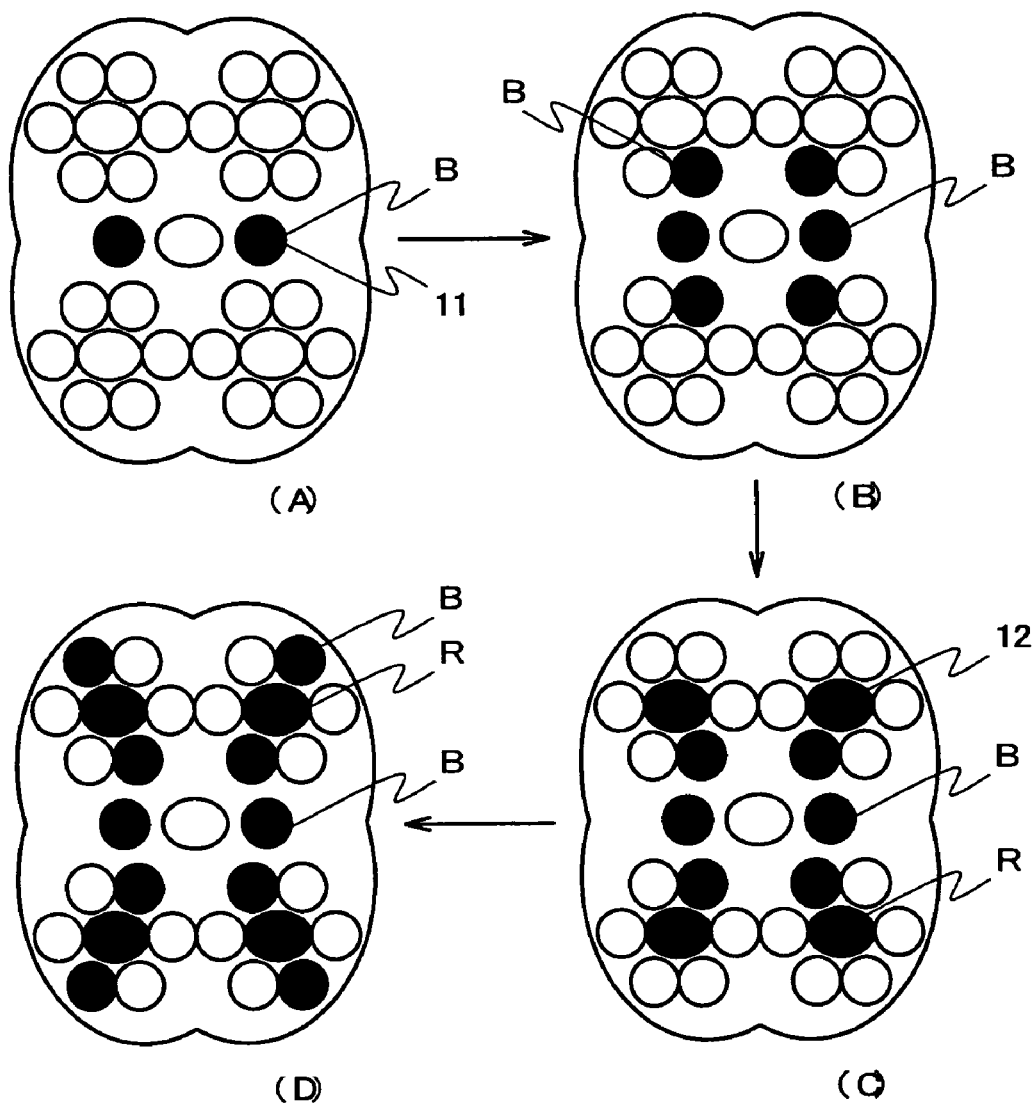
FIG. 10 is a plan view of a light-emission pattern in the case of "angry."

FIG. 10 shows a light-emission pattern corresponding to the word "angry" in plan view. In this case, the system control circuit 26 lights on the opposite light-emitting diodes 11 of the central three light-emitting diodes 11 and 12 (FIG. 10(A)), thereafter lights on the light-emitting diodes 11 above and below the light-emitting diodes 11 (FIG. 10(B)), and then lights on the multicolor light-emitting diodes above and below in red (FIG. 10(C)). Subsequently, the system control circuit 26 lights on the light-emitting diodes 11 outside the multicolor light-emitting diodes 12 (FIG. 10(D)) and thereafter lights off all the light-emitting diodes 11 and 12.

In this case, the system control circuit 26 instantly vibrates the vibrator 30 with a higher vibration frequency and generates a specified sound in synchronization with the instantaneous vibration.

For the feeling of "surprise," the word "surprising" is assigned for the case of being poked, in which case the system control circuit 26 lights on the light-emitting diodes 11 and 12 in a corresponding light-emission pattern, vibrates the whole in a corresponding vibration pattern, and outputs a corresponding sound.

For the feeling of "hatred," the word "hateful" is assigned to the case where bad information is sensed.

Figure 11:
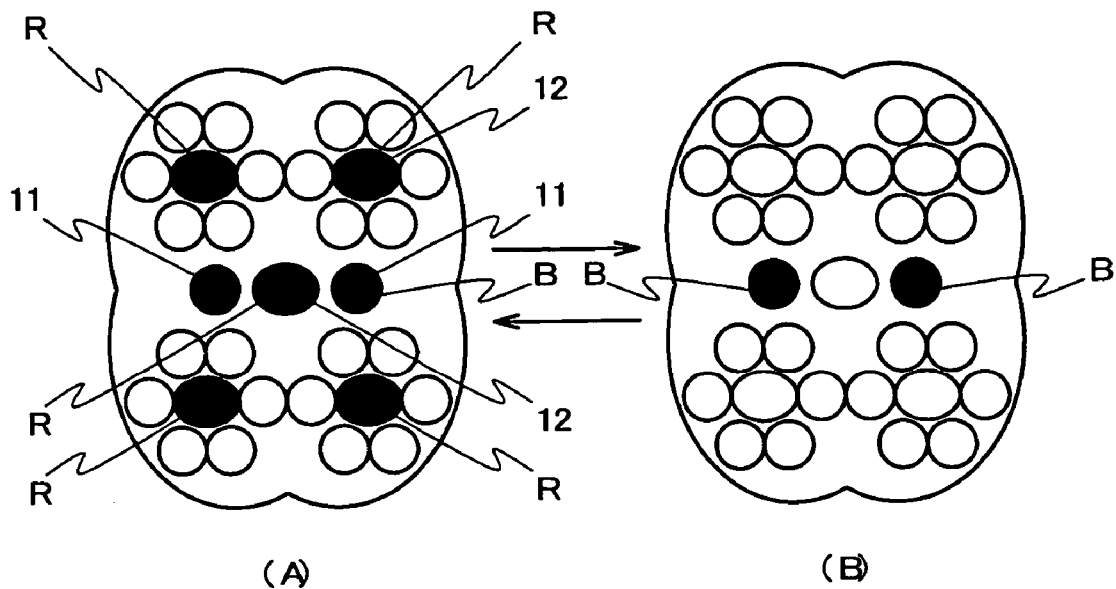
FIG. 11 is a plan view of a light-emission pattern in the case of "hatred."

For the "hateful," the system control circuit 26 lights on the light-emitting diodes 11 and 12 in the repeated light-emission pattern of FIGS. 11(A) and (B). This light-emission pattern is the same as that of "good," except that the light-emitting diodes 12 are lit on in red, in place of the green light emission of the multicolor light-emitting diodes 12 in the case of "good." The system control circuit 26 repeats the lighting in a shorter cycle than for the case of "good" and varies the rate of light emission, the luminance of the light-emitting diodes 11 and 12, and the volume of the sound, depending on the temperature sensed by the temperature sensor 21.

Figure 12:
FIG. 12 is a note of a sound in the case of "hatred."

The sound-reproducing section 25 is driven to generate a mechanical sound with two dull tones by the musical interval expressed by the note of FIG. 12, in synchronization with the lighting of the light-emitting diodes 11 and 12. The information transmitter 2 transmits the feeling of the information transmitter 2 to the user with the repeated light-emission pattern and sound.

For the feeling of "sorrow," the words "sorry," "unhappy," and "lonely" are assigned, in which case the "sorry" is set for the case where the user leaves the car, "unhappy" is set for the case where unhappy news is sensed, and "lonely" is set for the case of so-called being left to stand.

Figure 13:
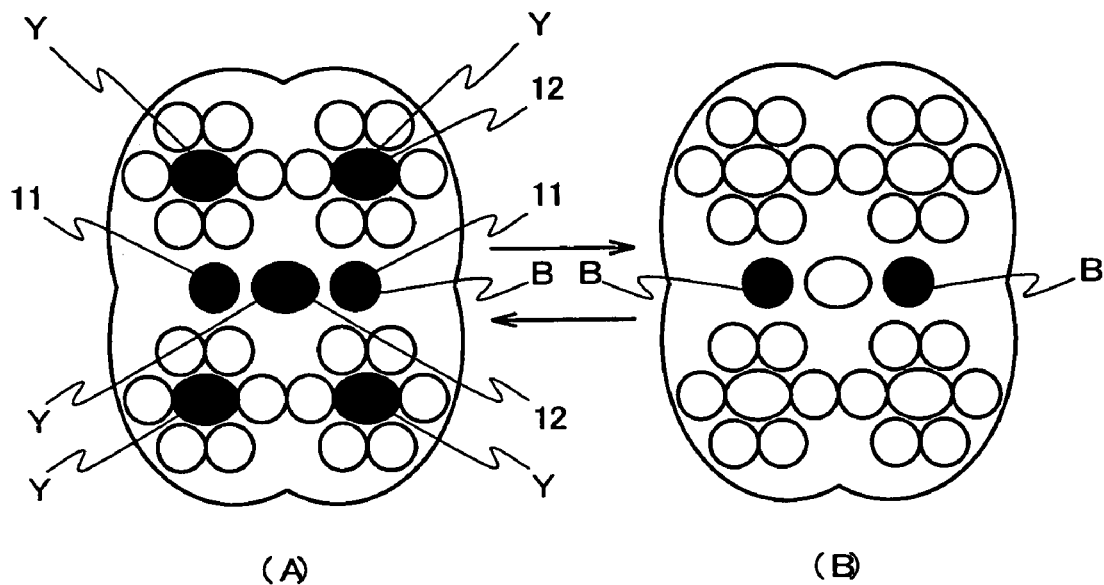
FIG. 13 is a plan view of a light-emission pattern in the case of "sorry."

With the word "sorry," the system control circuit 26 lights on the light-emitting diodes 11 and 12 with the repeated light-emission pattern of FIGS. 13(A) and (B). This light-emission pattern is the same as that of "good," except that the light-emitting diodes 12 are lit on in yellow, in place of the green light emission of the multicolor light-emitting diodes 12 in the case of "good." The system control circuit 26 repeats the lighting in a relatively slow cycle, as in the case of "good," and varies the rate of light emission, the luminance of the light-emitting diodes 11 and 12, and the volume of the sound depending on the temperature sensed by the temperature sensor 21.

Figure 14:
FIG. 14 is a note of a sound in the case of "sorry."

The sound-reproducing section 25 is driven to generate a sound with two mechanical tones by the musical interval expressed by the note of FIG. 14, in synchronization with the lighting of the light-emitting diodes 11 and 12.

Figure 15:
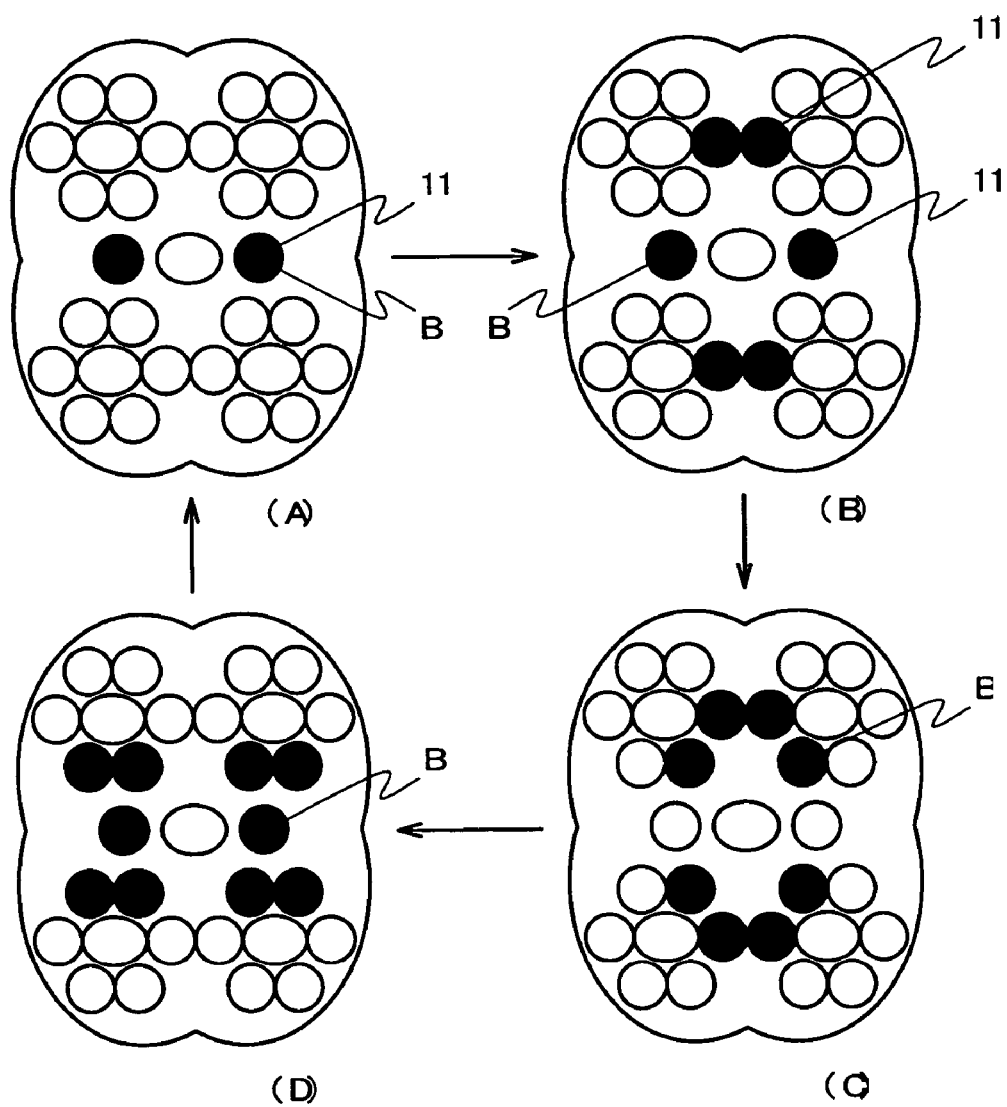
FIG. 15 is a plan view of a light-emission pattern in the case of "sorrow."

FIG. 15 shows a light-emission pattern corresponding to the basic word "sorrow" in plan view. In this case, the system control circuit 26 lights on the opposite light-emitting diodes 11 of the central three light-emitting diodes 11 and 12 (FIG. 15(A)), thereafter lights on the inner light-emitting diodes 11 above and below the light-emitting diodes 11 with one diode 11 therebetween (FIG. 15(B)), and then lights on the unlit light-emitting diodes 11 between the lit light-emitting diodes 11 (FIG. 15(C)). Subsequently, the system control circuit 26 lights off the light-emitting diodes 11 that lit on in FIG. 15(B) and lights on the light-emitting diodes 11 outside the light-emitting diodes 11 that lit on in FIG. 15(C) (FIG. 15(D)), and thereafter lights off all the light-emitting diodes 11.

In this case, the system control circuit 26 instantly vibrates the vibrator 31 with a lower vibration frequency and generates a specified sound in synchronization with the instantaneous vibration.

For the feeling of "sorrow," the system control circuit 26 selects a light-emission pattern, a vibration pattern, and a sound and drives them similarly.

For the feeling of "fear," the word "fearful" is set for the case of reckless driving and the like.

Figure 16:
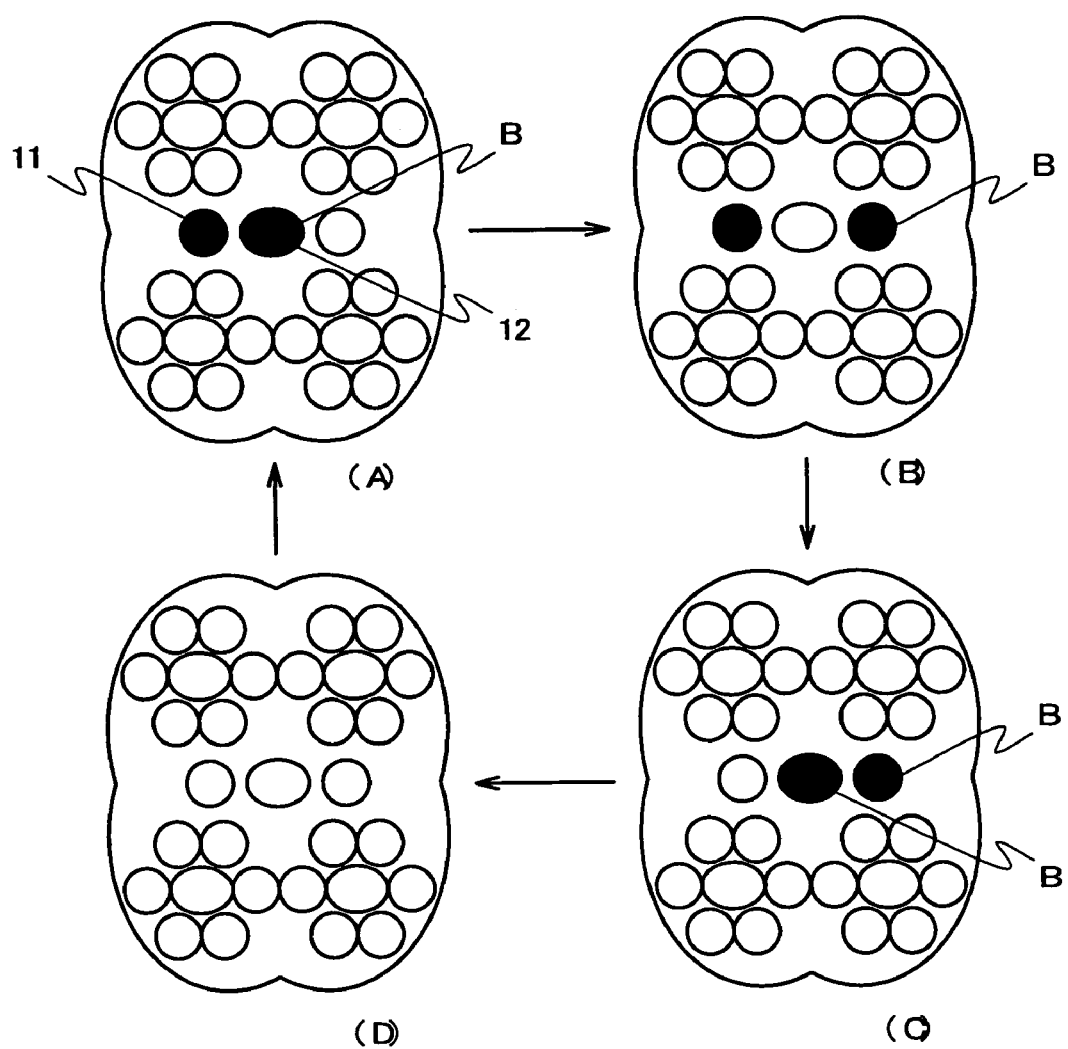
FIG. 16 is a plan view of a light-emission pattern in the case of "fearful."

FIG. 16 shows a light-emission pattern corresponding to the word "fearful" in plan view. In this case, the system control circuit 26 lights on the central and the left light-emitting diodes 12 and 11 of the central three light-emitting diodes 11 and 12 (FIG. 16(A)) and thereafter lights on the right light-emitting diode 11, in place of the central light-emitting diode 12 (FIG. 16(B)), in which case the multicolor light-emitting diode 12 is lit on in blue. Subsequently, the system control circuit 26 lights off the left light-emitting diodes 11, lights on the central light-emitting diode 12 in blue (FIG. 16(C)), and then lights off all the light-emitting diodes 11 (FIG. 16(D).

In this case, a system control circuit 26 vibrates the vibrators 30 and 31 and generates a specified sound in synchronization with the lighting.

Figure 17:
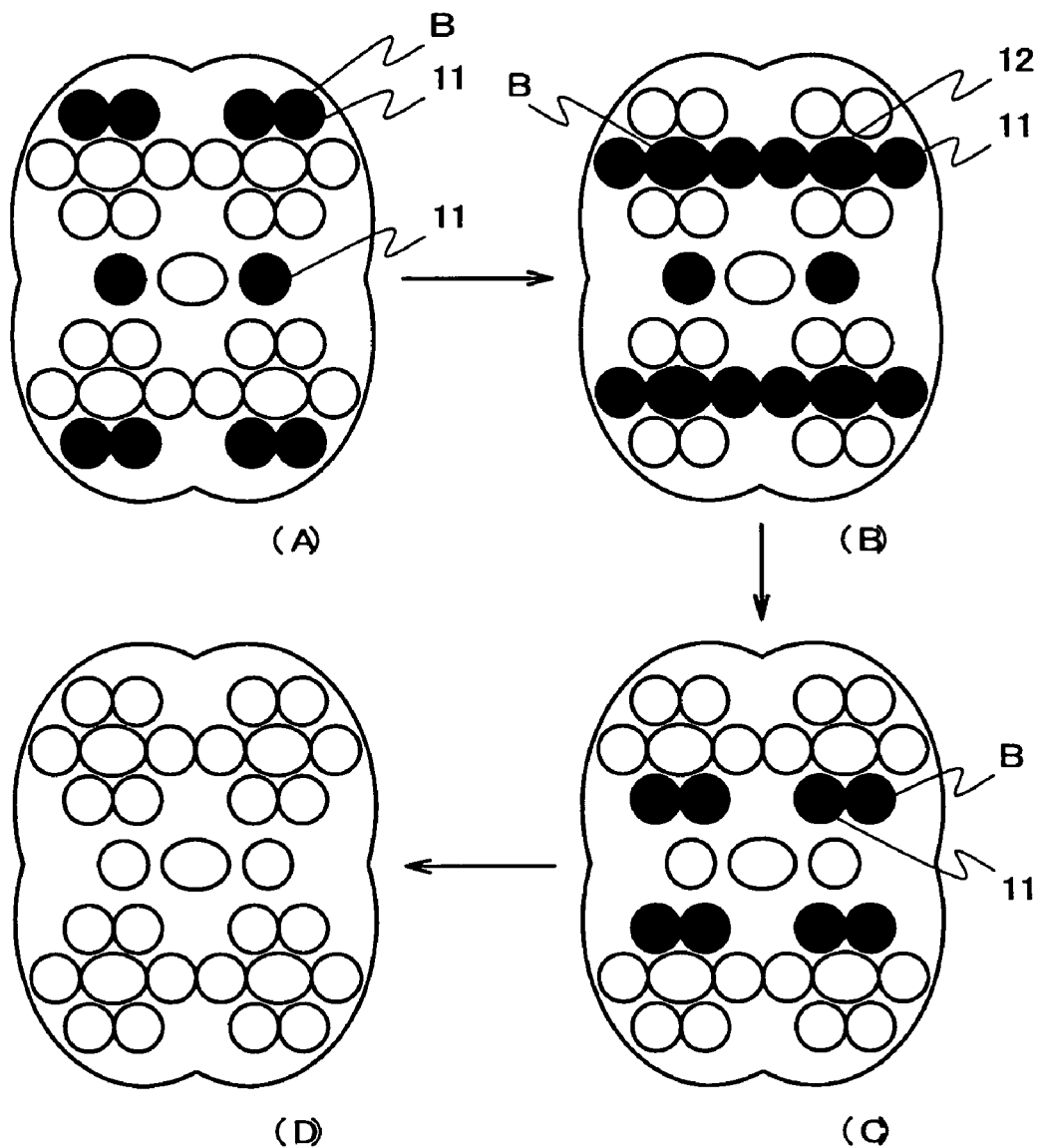
FIG. 17 is a plan view of a light-emission pattern in the case of "sleepy."

FIG. 17 shows a light-emission pattern corresponding to the word "sleepy" in plan view. In this case, the system control circuit 26 lights on the opposite light-emitting diodes 11 of the central three light-emitting diodes 11 and 12 and the uppermost-row and the lowermost-row light-emitting diodes 11 (FIG. 17(A)), and thereafter lights on the inner-row light-emitting diodes 11 and 12, in place of the uppermost-row and lowermost-row light-emitting diodes 11 (FIG. 17(B)), in which case the multicolor light-emitting diodes 12 are lit on in blue. Subsequently, the system control circuit 26 lights off the central and the opposite light-emitting diodes 11, lights on the inner-row light-emitting diodes 11 in place of the central and the opposite light-emitting diodes 11 that lit in FIG. 17(B) ((FIG. 17(C)), and then lights off all the light-emitting diodes 11 (FIG. 17(D)).

In this case, the system control circuit 26 stops the vibration of the vibrators 30 and 31 and the generation of a sound.

(1-2) Operation of First Embodiment

With the above structure, when the information transmitter 2 (FIGS. 1 to 4) is carried and placed in the cradle 15 of the personal computer 4, the battery 16 in the noncontact charging unit 17 is charged with electricity induced in a coil. Personal information is uploaded by the application programs of the personal computer 4, such as electronic mails stored in the personal computer 4, various information on favorite sites, favorite TV programs and genres, the use conditions of other devices, the application programs used in the personal computer, and personal information stored in the memory 34 is updated in accordance with these information. The personal information stored in the memory 34 is downloaded to the personal computer 4 as necessary.

When the information transmitter 2 is carried and placed in the cradle 15 of the car 3, the battery 16 is similarly charged and, of the personal information stored in the memory 34, authentication information concerning the driving of the car 3 is read out through the communication section 24, which allows the car 3 to be operated by a specified authentication process. Thus, the information transmitter 2 can be carried and used as a substitute for the key to the car 3. In this way, the information transmitter 2 is placed in the cradle 15 of the car 3, in which various personal information is downloaded and various personal information concerning driving is uploaded in various devices of the car 3. Accordingly, the information transmitter 2 processes the uploaded various personal information concerning driving with the personal computer 4, so that past destination, the skill of driving and so on can be known later. Moreover, personal information can be exchanged with other devices for use as a substitute for the key to home, entrance and exit control and so on.

Thus the information transmitter 2 analyzes inputted and outputted personal information to analyze user's hobbies and interests, and records the interest-related information in the memory 34 as personal information.

The information transmitter 2 which records and carries personal information obtains the information about vibration as external information from the acceleration sensor 22. The information transmitter 2 obtains personal information through the communication section 24 as similar external information. The information transmitter 2 analyzes external stimuli according to such information with the system control circuit 26, selects a light-emission pattern according to the analysis, and lights on the light-emitting diodes 11 and 12 with the light-emission pattern.

Thus the information transmitter 2 is capable of lighting on the light-emitting diodes 11 and 12 in various light-emission patterns depending on the contents of information about input and output and the vibration, sending back a response having unpredictability and the like as if it worked at its own discretion, and sending external information to the user by a complicated expressing technique such as the abstract-feeling expressions as if the information transmitter 2 had feelings, thereby increasing the attachment to the device as compared with the conventional ones.

In addition to the lighting of the light-emitting diodes 11 and 12 with such light-emission patterns, the information transmitter 2 is capable of sending back a response having unpredictability as if it was a living thing by the vibration of the vibrators 30 and 31 with specified vibration patterns or by the generation of sounds, thereby further increasing the attachment to the device as compared with the conventional ones.

Since the external information is personal information about input and output, the information transmitter 2 is capable of monitoring the input and output of information more vividly than modems in which merely light-emitting diodes are lit on and off during the input and output of information, thereby increasing the attachment to the device as compared with the conventional ones.

Since the external information is information on the vibration sensed by the acceleration sensor 22, the information transmitter 2 is capable of obtaining various responses by the actions such as striking, shaking, and tilting, thereby giving the user feelings as if the user kept a pet, and thus increasing the attachment to the device.

Of the responses, specified responses such as the rate of light emission, the rate of vibration, and the cycle of sound generation are varied depending on the temperature sensed by the temperature sensor 21. Therefore, for example, when the user is fatigued because of high temperature, the cycle of the light-emission pattern increases correspondingly. Thus the information transmitter 2 is capable of giving the user feelings as if the user kept a pet, and thus increasing the attachment to the device.

Similarly, the luminance of the light-emitting diodes 11 and 12 and the volume of the sound can also be varied depending on the temperature sensed by the temperature sensor 21, thereby giving the user feelings as if the user kept a pet. Thus the information transmitter 2 is capable of giving the user feelings as if the user kept a pet, and thus increasing the attachment to the device.

In this way, the information transmitter 2 generates virtual feelings in accordance with the external information when selecting a light-emission pattern, a vibration pattern, and a sound, with which setting the light-emission pattern and so on. Accordingly, the information transmitter 2 is capable of giving the user feelings as if the user kept a pet, and thus increasing the attachment to the device. The information transmitter 2 is also capable of transmitting various information to the user in terms of feelings.

Specifically, when various information is transmitted to the user by the lighting of the light-emitting diodes, as in the information transmitter 2 and when the information is a message, the light-emission pattern is required by the number of messages to transmit the details, increasing a burden on the user. However, when information is transmitted as feelings, as in this embodiment, the rough meaning of the information can be transmitted easily and reliably, even in an abstract and sensuous way, and the structure can also be simplified.

Since the virtual-feeling generation criterion is produced by the personal information that is exchanged with external devices and external stimuli, the information transmitter 2 is provided with individuality. Thus the information transmitter 2 can be used as a user's partner, thus increasing the attachment to the device.

The whole information transmitter 2 is housed in the front casing 5 and the back casing 6. The lighting of the light-emitting diodes 11 and 12 is viewed through the front casing 5. The light from the light-emitting diodes 11 and 12 can be let out from the front casing 5 through the reflector 8. Other parts cannot be viewed with the light from the light-emitting diodes 11 and 12 owing to the resist coating of the reflector 8 and the substrate 7.

In the information transmitter 2, the light-emitting diodes 11 and 12 are arranged in position on the substrate 7 to form a light-emission pattern and the multicolor light-emitting diode 12 is used for part of the light-emitting diodes. Accordingly, this embodiment is allowed to achieve complicated and delicate representations with a simple structure without using a large number of light-emitting diodes 11 and 12. Since the light-emitting means is constructed of the light-emitting diodes 11 and 12, the general structure can be simplified correspondingly.

In the information transmitter 2, the light from the light-emitting diodes 11 and 12 which is a point light source can be viewed as a surface light source and as the gradation corresponding to the wavy shape of the diffuser 10 through the use of the deflectors 9A and 9B and the diffuser 10 arranged on the reflector 8. The information transmitter 2 is driven by the driver 33 so that the volume of light is gradually varied; thus the light-emitting diodes 11 and 12 are lit on and off.

Accordingly, the light-emitting diodes 11 and 12 of the information transmitter 2 emit faint and deep light, thus ensuring rich representation.

The information transmitter 2 is capable of generating a rhythmic signal to the walking and generating a sound when being struck, thus providing interactivity with a user's action.

(1-3) Advantages of First Embodiment

With the above structure, a light-emission pattern is selected by the analysis of the information obtained from the exterior, with which a specified light-emitting means is driven, thus increasing the attachment to the device as compared with the conventional ones. This allows the user to always carry the device and to be given peace of mind.

Since virtual feelings are generated depending on the information obtained, depending on which a light-emission pattern is selected, the user is given a feeling as if the information transmitter had feelings, thus increasing the attachment to the device.

When the external information is vibration information, it is given as a signal outputted from the acceleration sensor. Accordingly, the user is given a response like a pet by the operation such as striking and shaking.

Since the rate of the light emission with a light-emission pattern is varied depending on the determination of the temperature-sensing means, a richer response can be generated, thus increasing the attachment to the device.

Since external information is user's personal information and the personal information obtained through the communicating means is acquired as the external information, user's hobbies and interests can be collected and responses corresponding to the hobbies and interests can be produced.

Since the light-emission with such a light-emission pattern is produced by the light-emitting means constructed of a plurality of light-emitting diodes arranged in position, the entire structure can be simplified, and power consumption can be reduced. Since the user is provided with less visual information than with the case where the light-emitting means is constructed of a liquid crystal panel, the user does not lose interest in it.

In addition to the light-emission pattern, a vibration pattern is selected, with which a specified vibration element is driven, so that a response with unpredictability can be produced, thus increasing the attachment to the device.

In addition to the light-emission pattern, a sound is selected and sound-generating means is driven to output the sound, so that a response with a rich expression of feeling can be sent back.

Since the whole is housed in the casing, through which the light emission of the light-emitting means can be monitored, a good design can be ensured.

The transmitter is portable and generates a charging power by the electricity induced in a coil, with which it charges a built-in battery and supplies electricity to elements with the power of the battery. Accordingly, the transmitter can be constructed without the need for a power supply terminal and so on, thus ensuring a good design and providing the user with the feelings like a living thing.

When external information cannot be given for a specified period of time or more, the selection of the light-emission pattern is stopped and the driving of the light-emitting means is stopped. Accordingly, wasteful power consumption can be effectively prevented. Conversely, the transmitter can be activated by the operation of starting, shaking, or tilting. Thus the transmitter can be brought into contact with the user, like a living thing, and ensures a good design by omitting switches and so on.

Since user's personal information is inputted and outputted and recorded to be held, a personal-information portable device can be provided to which the user is attached.

(2) Second Embodiment

In this embodiment, the invention is applied to a cellular phone, in which light-emission patterns, vibration patterns, and sounds are generated depending on incoming information and vibration information in which light-emitting means with a plurality of light-emitting diodes, a vibrator, and a sound-reproducing section are driven as in the first embodiment.

The embodiment, which is applied to a cellular phone, can offer the similar advantages as those of the first embodiment.

(3) Other Embodiments

While the first embodiment has been described which is carried with personal information recorded, the invention is not limited to that and has wide application to the case of carrying others' personal information for exchanging business cards. It may also be widely applied to portable music playback devices, toys, in-vehicle or portable radars and so on.

The above embodiment has been described for the case of driving light-emitting means with a preset light-emission pattern. The invention, however, is not limited to that and the light-emission pattern may be downloaded for update through a communication means. The update by the downloading may include the update of a vibration pattern and a sound.

While the above embodiment has been described for the case of transmitting external information to the user with a light-emission pattern, a vibration pattern, and a sound, the invention is not limited to that and the external information may be transmitted to the user only with a vibration pattern and a sound.

While the above embodiment has been described for the case in which the invention is applied to portable devices, the invention is not limited to that and has wide application to various monitoring mechanisms for cars and in-vehicle devices and various monitoring mechanisms for audiovisual apparatuses and so on.

According to the invention, a light-emission pattern is selected by analysis of information obtained from the exterior, with which a specified light-emitting means is driven, thus increasing the attachment to the device as compared with the conventional ones.

INDUSTRIAL APPLICABILITY

The present invention relates to an apparatus and a method for transmitting information and to a monitoring device, which can be applied to, for example, portable personal information devices.

The invention claimed is:

1. An information transmitter comprising:
   an information-obtaining device, which obtains information from the exterior;
   an information-analyzing device, which analyzes the information obtained by the information-obtaining device and selects a light-emission pattern; and
   a driving device, which drives a specified light-emitting device with the light-emission pattern, wherein
   the information-analyzing device generates a virtual feeling in response to the information obtained by the information-obtaining device and selects the light-emission pattern depending on the virtual feeling.

2. An information transmitter according to claim 1, wherein the light-emitting device includes a plurality of light-emitting diodes with a specified arrangement.

3. An information transmitter according to claim 1, wherein
   the information-analyzing device selects a vibration pattern in addition to the light-emission pattern; and
   the driving device drives a specified vibration element with the vibration pattern.

4. An information transmitter according to claim 1, wherein
   the information-analyzing device selects a sound in addition to the light-emission pattern; and
   the driving device drives sound-generating means to output the sound.

5. An information transmitter according to claim 1, wherein
   the information-analyzing device selects a vibration pattern and a sound in addition to the light-emission pattern; and
   the driving device drives sound-generating means to output the sound and drives a specified vibration element with the vibration pattern.

6. An information transmitter according to claim 1, further comprising:
   a casing for housing the light-emitting device.
   wherein
   the light emission of the light-emitting device can be monitored through the casing.

7. An information transmitter according to claim 1, wherein
   the transmitter is portable; and comprises
   a charging mechanism for generating charging power by the electricity induced in a coil and charging a built-in battery with the charging power; and
   a power supply for supplying the power of the battery to various elements.

8. An information transmitter according to claim 1, wherein
   when the information cannot be obtained by the information-obtaining device for a specified time or more,
   the information-analyzing device stops the selection of the light-emission pattern; and
   the driving device stops the driving of the light-emitting device.

9. An information transmitter according to claim 1, further comprising:
- inputting and outputting device for inputting and outputting at least user's personal information; and
- recording device for recording and storing the personal information.

10. An information transmitter comprising:
- an information-obtaining device, which obtains information from the exterior;
- an information-analyzing device, which analyzes the information obtained by the information-obtaining device and selects a light-emission pattern; and
- a driving device, which drives a specified light-emitting device with the light-emission pattern, wherein:
- the information is information on vibration; and the information-obtaining device obtains the information with an acceleration sensor.

11. An information transmitter comprising:
- an information-obtaining device, which obtains information from the exterior;
- an information-analyzing device, which analyzes the information obtained by the information-obtaining device and selects a light-emission pattern; and
- a driving device, which drives a specified light-emitting device with the light-emission pattern, wherein
- the driving device varies the rate of the light emission with the light-emission pattern depending on the detection of temperature by a temperature-sensing device.

12. An information transmitter comprising:
- an information-obtaining device, which obtains information from the exterior;
- an information-analyzing device, which analyzes the information obtained by the information-obtaining device and selects a light-emission pattern; and
- a driving device, which drives a specified light-emitting device with the light-emission pattern, wherein
- the information is user's personal information; and
- the information-obtaining device obtains the personal information with a specified communicating device.

13. A method for transmitting information, comprising:
- a light-emission-pattern selecting step of selecting a light-emission pattern by analyzing information obtained from the an exterior; and
- a driving step of driving a specified light-emitting device with the light-emission pattern wherein
- the light-emission-pattern selecting step comprises:
- a virtual-feeling generating step of generating a virtual feeling in response to the information obtained from the exterior; and
- a selecting step of selecting the light-emission pattern in response to the virtual feeling.

* * * * *